United States Patent
Deacon

(10) Patent No.: US 10,875,175 B2
(45) Date of Patent: Dec. 29, 2020

(54) ROBOTIC GRIPPING DEVICE SYSTEM AND METHOD

(71) Applicant: OCADO INNOVATION LIMITED, Hatfield (GB)

(72) Inventor: Graham Deacon, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 196 days.

(21) Appl. No.: 16/074,988

(22) PCT Filed: Feb. 1, 2017

(86) PCT No.: PCT/EP2017/052102
§ 371 (c)(1),
(2) Date: Aug. 2, 2018

(87) PCT Pub. No.: WO2017/134076
PCT Pub. Date: Aug. 10, 2017

(65) Prior Publication Data
US 2019/0084152 A1    Mar. 21, 2019

(30) Foreign Application Priority Data

Feb. 2, 2016 (GB) .................. 1601880.6

(51) Int. Cl.
*B25J 9/16* (2006.01)
(52) U.S. Cl.
CPC .......... *B25J 9/1612* (2013.01); *B25J 9/1607* (2013.01); *G05B 2219/39466* (2013.01); *G05B 2219/39505* (2013.01)

(58) Field of Classification Search
CPC ...... B25J 9/1612; B25J 9/1607; B25J 13/085; B25J 15/0009; B25J 15/08; G05B 2219/39466; G05B 2219/39505
USPC .......................................... 700/245
See application file for complete search history.

(56) References Cited

U.S. PATENT DOCUMENTS

| 4,680,523 A | 7/1987 | Goumas et al. |
| 4,783,107 A | 11/1988 | Parker et al. |
| 5,141,097 A * | 8/1992 | Oiry ....................... B65G 43/08 198/444 |

(Continued)

FOREIGN PATENT DOCUMENTS

| GB | 1569348 | 6/1980 |
| WO | 2014/166650 A1 | 10/2014 |

OTHER PUBLICATIONS

International Search Report (PCT/ISA/210) dated Jul. 6, 2017, by the European Patent Office as the International Searching Authority for International Application No. PCT/EP2017/052102.

(Continued)

*Primary Examiner* — Jaime Figueroa
(74) *Attorney, Agent, or Firm* — Buchanan Ingersoll & Rooney PC

(57) ABSTRACT

A robotic gripping device, system and method are disclosed. The robotic device includes an end effector having at least one finger, the fingers being configured for manipulating objects in the vicinity of the device under computer control. The device is configured for manipulating objects of varying sizes, dimensions and positions with reference to the device, without requiring information as to the precise location of the object with reference to the device.

12 Claims, 2 Drawing Sheets

(56) References Cited

U.S. PATENT DOCUMENTS

| | | | | |
|---|---|---|---|---|
| 5,165,520 A | * | 11/1992 | Herve | B07C 5/02 198/396 |
| 5,374,830 A | * | 12/1994 | Pryor | B25J 9/1692 250/559.3 |
| 5,802,201 A | * | 9/1998 | Nayar | B25J 9/1697 382/106 |
| 6,854,588 B1 | * | 2/2005 | Blattner | B65G 47/78 198/418.6 |
| 9,452,894 B2 | * | 9/2016 | Puchwein | B65G 1/1378 |
| 2009/0287354 A1 | * | 11/2009 | Choi | B25J 9/1682 700/261 |
| 2010/0012464 A1 | * | 1/2010 | Schiesser | B65G 47/844 198/460.1 |
| 2010/0152899 A1 | * | 6/2010 | Chang | B25J 9/1682 700/262 |
| 2011/0170998 A1 | * | 7/2011 | Winkler | B65G 47/90 414/564 |
| 2014/0188277 A1 | | 7/2014 | Lee et al. | |
| 2015/0266183 A1 | * | 9/2015 | Alifragkis | B25J 9/1692 700/254 |
| 2016/0075521 A1 | * | 3/2016 | Puchwein | B65G 1/1378 700/218 |
| 2017/0095382 A1 | * | 4/2017 | Wen | G16H 40/67 |

OTHER PUBLICATIONS

Written Opinion (PCT/ISA/237) dated Jul. 6, 2017, by the European Patent Office as the International Searching Authority for International Application No. PCT/EP2017/052102.

Combined Search and Examination Report dated Jul. 28, 2017, by the Great Britain Patent Office in corresponding Great Britain Application No. GB1701635.3. (3 pages).

J. Craig et al., "Introduction to Robotics Mechanics and Control", Second Edition, Addison-Wesley Publishing Company, Inc., 1989. (459 pages).

Graham Edwin Deacon, "Accomplishing Task-Invariant Assembly Strategies by Means of an Inherently Accommodating Robot Arm", The University of Edinburgh, 1997. (247 pages).

* cited by examiner

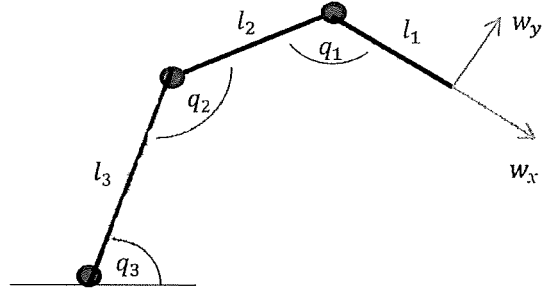
Figure 1: Manipulator parameters
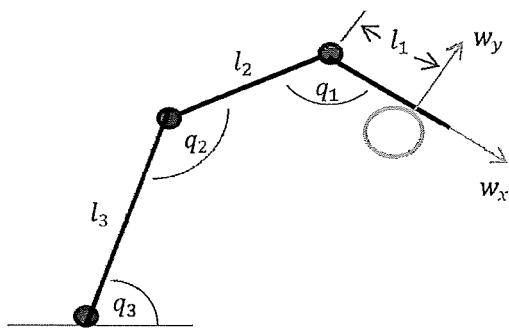
Figure 2: Contact with the environment coincident with the wrench frame of reference
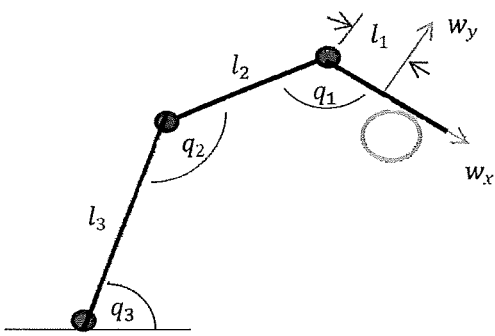
Figure 3: Contact with the environment distal to the wrench frame of reference

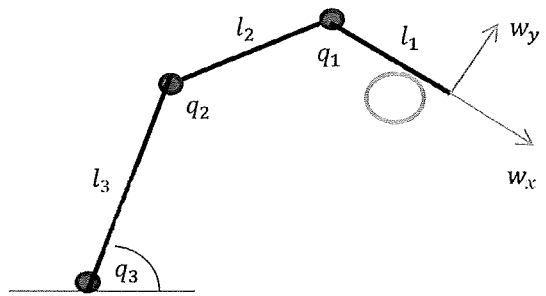
Figure 4: Contact with the environment proximal to the wrench frame of reference

ROBOTIC GRIPPING DEVICE SYSTEM AND METHOD

The present invention relates to a robotic gripping system and method. More specifically, but not exclusively it relates to a device, system and method for operating a robotic gripping device such as that forming part of a robotic hand, often referred to as a robot end-effector.

The present application claims priority from UK Patent Application No GB1601880.6 filed on 2 Feb. 2016 the content of which is hereby incorporated by reference.

Most known robot end-effectors that include articulated linkages, i.e. fingers, use linkages that are under-actuated or possess less degrees of freedom than necessary to achieve both a desired position and orientation independently. This precludes full control of the wrench at the linkage's distal link resulting in a limited range of behaviours when interacting with objects to be gripped, picked up, moved or otherwise manipulated by the end effector.

Furthermore, it is a disadvantage of presently known systems that the precise location of an object, to be moved, picked up or gripped, with respect to the hand is required in order to manipulate said object.

It is an object of the present invention to overcome these difficulties with present known systems and devices.

According to the invention there is provided a system, method or device for manipulating an object, where the precise location of the object with reference to the device need not be known.

The invention provides a device, system or method for controlling the behaviour of motorised linkages whose joints are force- and/or torque-controllable, in a manner that determines the relationship that the linkage adopts when in contact with another object.

The invention will now be described, with reference to the accompanying diagrammatic drawings in which:

FIG. 1 is a schematic diagram of a robot end effector represented as an articulated linkage in order to define the parameters required: $l_i$ is the length of link i; $w_x$ and $w_y$ are the x and y axes respectively of the frame of reference w associated with the distal link, in which a manipulator controlled wrench is described;

FIG. 2 is a schematic diagram of the manipulator of FIG. 1 showing contact between the manipulator and the environment where the contact lies along the $w_y$ axis of the wrench frame of reference w;

FIG. 3 is a schematic diagram of the manipulator of FIG. 1 showing contact between the manipulator and the environment distal to the $w_y$ axis of the wrench frame of reference w; and FIG. 4 is a schematic diagram of the manipulator of FIG. 1 showing contact between the manipulator and the environment proximal to the $w_y$ axis of the wrench frame of reference.

FIG. 1 shows a schematic diagrammatic representation of a manipulator, consisting of an articulated linkage connected by revolute joints where joints are driven in such a manner as to be torque-controlled. Other articulations are possible, providing both position and orientation of the manipulator's tip can be independently specified throughout some region of the manipulator's workspace.

The relationship between a motorised linkage's joint forces and/or torques and the wrench it exerts in a frame of reference located at its tip is well known; it is expressed using the transpose of the linkage's Jacobian. (The Jacobian expresses the differential mapping between joint velocities and tip velocities and is a representation of the kinematics of the linkage.)

If it is assumed that a motorised linkage's joint forces and/or torques are under computer, i.e. software control, then the physical behaviour of a distal link in contact with another object changes when the location of the frame of reference that the wrench is commanded in, w, is "moved" in software by changing the parameters representing the length of one or more links used in the software calculation of the linkage's Jacobian transpose.

The behaviour of the linkage when it interacts with another object varies with the location of the wrench reference frame and the location of a point of contact with respect to that reference frame. This wrench reference frame can be determined in software which makes the interaction behaviour computer controllable. This enables the grasp behaviour to be specified depending on the object to be handled, moved, picked-up, gripped or otherwise manipulated. This diversity of interaction behaviour creates a versatility of function from the same mechanical construction, reducing the variety of grippers needed to be mounted on robot arms to cover picking up a range of goods.

This is described in more detail below with reference to the Figures.

The relationship between joint torques/forces and end-point wrench is usually described by the relationship $$\tau = J^T(q) \cdot {}^w f \qquad (1)$$

Where $\tau$ is a vector of joint torques/forces q represents the set of joint variables J(q) is the manipulator Jacobian (which is a matrix of differential coefficients)

$J^T(q)$ is the transpose of the manipulator Jacobian ${}^w f$ is a vector of forces and torques (or wrench) in a frame of reference, w, attached to the distal link.

Normally the Jacobian is defined with respect to a frame of reference aligned with a manipulator's base coordinates (see for example J. J. Craig, "Introduction to Robotics: Mechanics and Control", Addison Wesley, 1989). It can however, be defined in a frame of reference aligned with the distal link of a manipulator. In this case, for the manipulator shown in FIG. 1, the Jacobian transpose is derived in G. E Deacon, "Accomplishing Task-Invariant Assembly Strategies by Means of an Inherently Accommodating Robot Arm", PhD Thesis, Department of Artificial Intelligence, University of Edinburgh, 1997:

$$J^T(q) = \begin{pmatrix} 0 & l_1 & 1 \\ -l_2\sin(q_1) & l_1 - l_2\cos(q_1) & 1 \\ -l_2\sin(q_1) + l_3\sin(q_1 + q_2) & l_1 - l_2\cos(q_1) + l_3\cos(q_1 + q_2) & 1 \end{pmatrix}$$

With reference to the Jacobian above, it will be appreciated that the Jacobian is not only a function of joint angles, but also link lengths. So equation (1) can be re-written as:

$$\tau = J^T(q,l) \cdot {}^w f \qquad (2)$$

Where l represents the set of link lengths.

The value of $l_1$ defines where along the distal link the frame, w, in which the end-point wrench is expressed, lies. The value of $l_1$ may or may not be the full length of the distal link.

When the distal link is in contact with something in the environment the location of frame w, with respect to the contact point, will contribute to determining the behaviour of the manipulator. There are three distinct cases that controlling the value of $l_1$ in software determines:

1) Frame of Reference at the Contact Point

In the first case, as shown in FIG. 2, the $w_y$ axis of the wrench frame of reference w passes through the contact point, represented at the circle adjacent to the distal link. The value of $l_1$ need not be the full length of the distal link, as shown in FIG. 2.

If, in this situation a force is commanded in the $-w_y$ direction (assuming nothing breaks) there will be an equal and opposite reaction force generated at the point of contact. This will result in static equilibrium and nothing moves.

2) Frame of Reference Proximal to the Contact Point

In the second case, as shown in FIG. 3, the wrench frame of reference is proximal to the contact point, represented at the circle adjacent to the distal link. The value of $l_1$ will be less than the full length of the distal link.

If, in this situation a force is commanded in the $-w_y$ direction (assuming nothing breaks) there will be a reaction force generated at the point of contact which will induce a positive moment about the wrench frame of reference, w. This will result in an anticlockwise motion of the distal link until, as the link rolls over the contact point, the $w_y$ axis of the wrench frame w will pass through the contact point and case 1) will hold.

3) Frame of Reference Distal to the Contact Point

In the third case, as shown in FIG. 4, the wrench frame of reference is distal to the contact point, represented at the circle adjacent to the distal link. The value of $l_1$ need not be the whole length of the distal link, but it may be, or it may be set in software beyond the length of the distal link.

If, in this situation a force is commanded in the $-w_y$ direction (assuming nothing breaks) there will be a reaction force generated at the point of contact which will induce a negative moment about the wrench frame of reference which will result in a clockwise motion of the distal link until, as the link rolls over the contact point, the the $w_y$ axis of the wrench frame w will be coincident with the contact point and case 1) will hold.

In all of the above examples, suitable software utilities may control both the location of the wrench frame of reference w (by controlling the value of $l_1$), and the forces and torques that the finger exerts in that frame of reference.

If the manipulator represented schematically above, is actually a finger on a gripper, the parameters described above can be controlled in appropriate software to determine the natural behaviour of the finger when it comes into contact with an object. It will be appreciated that an end effector may comprise a plurality of fingers as described above and need not be limited to any given number, although end effectors comprising 2, 3, 4 or 5 fingers are envisaged.

It will be appreciated from the foregoing that this can be achieved without having to know where the precise location of the wrench frame needs to be. It is sufficient that it is placed on the correct side of the contact point to induce the desired behaviour, and this can even be (mathematically) beyond the extent of the distal link.

In this way, a suitable end effector having the foregoing properties may be designed and controlled via suitable software utilities to pick up, grip and or move objects without knowledge of the precise location of the object with reference to the manipulator being known.

With an appropriate choice of relative location of the described device with respect to another part of the end-effector, or with respect to another instance of the described device, it would be possible to use the described control scheme to perform in-hand manipulation, for example the rolling of an object between two fingers.

Advantageously the device, system and method may be used in situations where a diversity of robot grasps are required because of the need to handle a range of different objects in qualitatively different ways.

For example, the gripper may be used to pick objects under computer control, in a warehouse environment and place them in containers or bins in order to fulfil customer orders in an online retail system.

The objects to be picked may be deformable or pliable and need not be rigid or of known or fixed shapes, such as boxes or cans. Indeed, it will be appreciated that a single robotic picking device comprising end effectors described above need not always pick the same type of object but may pick differently sized and shaped objects consecutively as part of a picking operation.

Furthermore, picking devices comprising manipulators or end effectors as described above may form part of larger picking operations using multiple picking devices.

The invention claimed is:

1. A device for manipulating an object, the device comprising:
   a series of motorised linkages;
   joints between the linkages which are force and/or torque controllable according to whether they are prismatic or revolute, such that a relationship of a distal linkage of the series of motorised linkages when in contact with the object will be independent of an initial contact position of the object with reference to the linkage; and
   a controller for positioning of the motorised linkages with respect to the object, the controller configured to apply a force along a predetermined direction at a predetermined point located on the distal linkage until the distal linkage reaches static equilibrium such that a frame of reference about which the controller coincides with a contact point between the distal linkage and the object, wherein a location of the object with reference to the device is unknown; and
   the motorised linkages being configured to manipulate the object in response to the distal linkage reaching static equilibrium.

2. A method of manipulating an object using a device having a series of motorised linkages, the method comprising:
   positioning of the series of motorised linkages with respect to the object, wherein a location of the object with reference to the device is unknown;
   applying a force along a predetermined direction at a predetermined point located on a distal linkage of the series of motorised linkage until the distal linkage reaches static equilibrium such that a frame of reference about which the device coincides with a contact point between the distal linkage and the object, wherein a location of the object with reference to the device is unknown; and
   manipulating, by the series of motorised linkages, the object in response to the distal linkage reaching static equilibrium.

3. A system for manipulating an object, the system comprising:
   a device having:
      a series of motorised linkages, the series of motorised linkages having joints between the linkages which are force and/or torque controllable according to whether they are prismatic or revolute, such that a relationship of a distal linkage of the series of motorised linages when in contact with the object will be independent of an initial contact position of the object with reference to the distal linkage and a controller for precise positioning of the motorised linkage with respect to an object, wherein a precise location of the object with reference to the device is unknown;

a controller for positioning of the motorised linkages with respect to the object, the controller configured to apply a force along a predetermined direction at a predetermined point located on the distal linkage until the distal linkage reaches static equilibrium such that a frame of reference about which the controller coincides with a contact point between the distal linkage and the object, wherein a location of the object with reference to the device is unknown; and a software utility for controlling a movement of the device.

4. A system for manipulating an object according to claim 3 in which the software utility comprises:

a series of instructions operable on computer means.

5. A system according to claim 3, wherein the object to be manipulated can be any of a plurality of inventory items located in a warehouse.

6. A warehousing system comprising:

a warehouse environment;

a device having:

a series of motorised linkages for movement relative to the warehouse environment, the series of motorised linkages having joints between the linkages which are force and/or torque controllable according to whether they are prismatic or revolute, such that a relationship of a distal linkage of the series of motorised linages when in contact with the object will be independent of an initial contact position of the object with reference to the distal linkage; and a controller for positioning of the motorised linkages with respect to the object, the controller configured to apply a force along a predetermined direction at a predetermined point located on the distal linkage until the distal linkage reaches static equilibrium such that a frame of reference about which the controller coincides with a contact point between the distal linkage and, wherein a location of the object with reference to the device is unknown.

7. The device according to claim 1, wherein when the distal linkage is in contact with the object at a position proximal to the frame of reference the force causes a reaction force at the contact point which induces a positive moment about the frame of reference resulting in an anti-clockwise motion of the distal linkage.

8. The device according to claim 1, wherein when the distal linkage is in contact with the object at a position distal to the frame of reference the force causes a reaction force a the contact point which induces a negative moment about the frame of reference resulting in a clockwise motion of the linkage.

9. The method according to claim 2, comprising:

in response to the distal linkage contacting the object at a position proximal to the frame of reference the force causes a reaction force at the contact point which induces a positive moment about the frame of reference resulting in an anticlockwise motion of the distal linkage.

10. The method according to claim 2, comprising:

in response to the distal linkage contacting the object at a position distal to the frame of reference the force causes a reaction force a the contact point which induces a negative moment about the frame of reference resulting in a clockwise motion of the linkage.

11. The system according to claim 3, wherein when the distal linkage is in contact with the object at a position proximal to the frame of reference the force causes a reaction force at the contact point which induces a positive moment about the frame of reference resulting in an anti-clockwise motion of the distal linkage.

12. The system according to claim 3, wherein when the distal linkage is in contact with the object at a position distal to the frame of reference the force causes a reaction force a the contact point which induces a negative moment about the frame of reference resulting in a clockwise motion of the linkage.

* * * * *